LOUIS G. BAILEY
MAURICE J. BRAU
ALBERT R. HILTON
INVENTORS

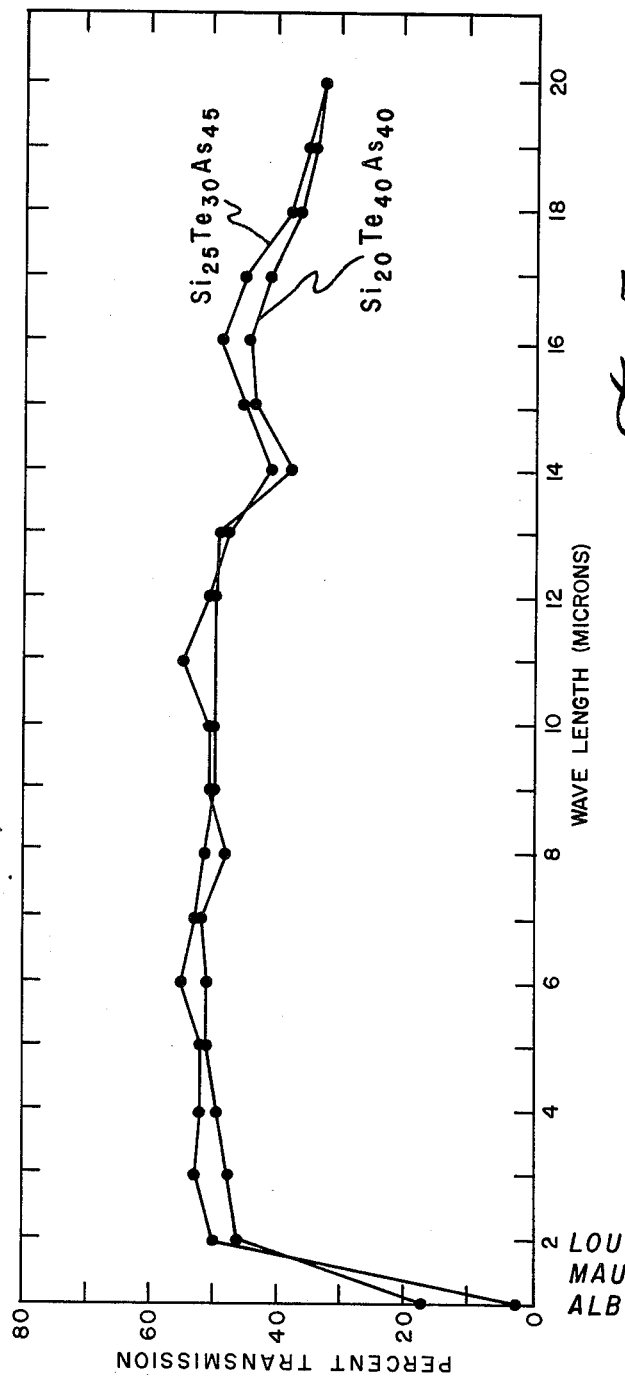

3,154,424
GLASS AND METHOD OF MAKING IT

Louis G. Bailey, Maurice J. Brau, and Albert R. Hilton, Richardson, Tex., assignors to Texas Instruments Incorporated, Dallas, Tex., a corporation of Delaware
Filed May 14, 1962, Ser. No. 194,312
13 Claims. (Cl. 106—47)

This invention relates to an amorphous composition of matter. More particularly it relates to an infrared transparent glass and to a method of making it.

The invention disclosed herein appertains to silicon-arsenic-tellurium amorphous glass composition which is transparent to the infrared region of the electromagnetic spectrum. Moreover, the invention provides compositions of matter having good transmission in the 1 to 20 micron wave length region of the electromagnetic spectrum.

The glass of the invention may contain about 5 to 45 atom percent silicon, 30 to 75 atom percent tellurium and 5 to 50 atom percent arsenic. The amorphous composition of matter of the invention may be made by forming a melt of the constituents and quench-cooling the melt from about 1000° C. to room temperature in air.

It is therefore an object of the invention to provide an amorphous composition of matter comprising silicon, arsenic and tellurium.

Another object of the invention is to provide an amorphous compoistion of matter having a high transmission in the 1 to 20 micron wave length region of the electromagnetic spectrum.

A further object of the invention is to provide an amorphous composition of matter comprising from 5 to 45 atom percent silicon, 30 to 75 atom percent tellurium and 5 to 50 atom percent arsenic.

Another object of this invention is to provide a ternary silicon-arsenic-tellurium amorphous composition of matter having good transmission at high temperatures in the 1 to 20 micron wave length region of the electromagnetic spectrum.

A further object of the invention is to provide a method of making a ternary amorphous composition of matter having a transmission in the 1 to 20 micron region of the electromagnetic spectrum.

It is still a further object of the invention to provide a quench-freeze method of making ternary silicon-arsenic-tellurium amorphous compositions of matter having high softening points.

Still another object of the invention is to provide a ternary silicon-arsenic-tellurium amorphous composition of matter exhibiting a high softening point and good transmission in the 1 to 20 micron region of the electromagnetic spectrum.

These and other obpects, advantages and features of the invention will become more readily apparent from the following detailed description taken in conjunction with the appended claims and attached drawings wherein:

FIGURE 3 is a graphical representation of percent transmission at room temperature of various wave lengths of the electromagnetic spectrum for various glass compositions.

Figure 1:
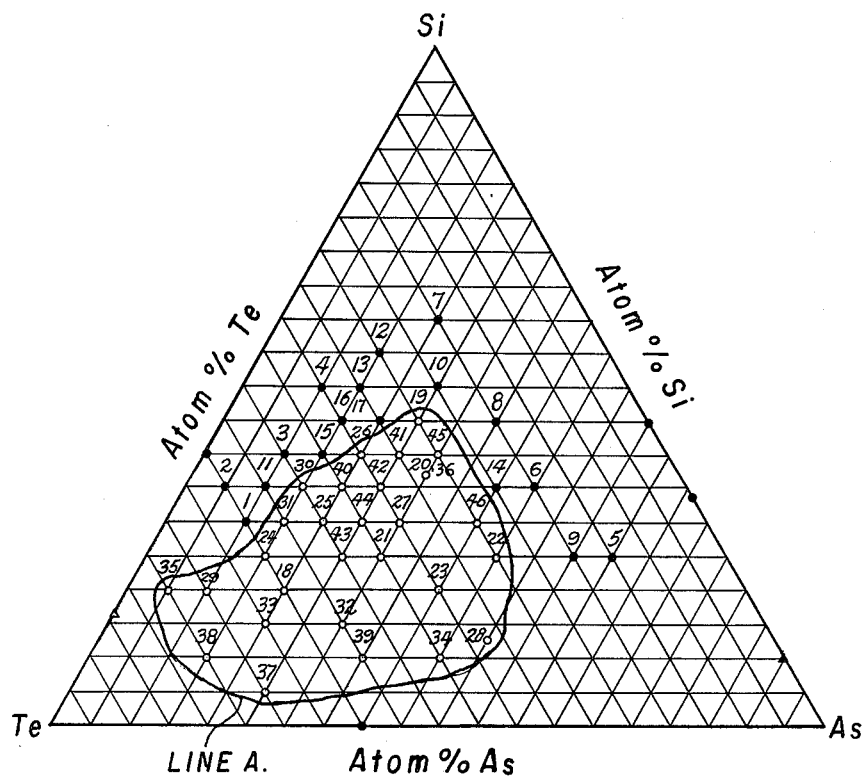
FIGURE 1 depicts a ternary diagram of the atomic percentages of silicon, arsenic, and tellurium for various amorphous compositions of matter of the invention.

Referring to FIGURE 1, various compositions of silicon, arsenic and tellurium were compounded and evaluated to determine whether they were amorphous or crystalline. The general procedure for making the various compositions is described hereinafter.

Various atomic percents of silicon, tellurium and arsenic were chosen for each sample to be made. The appropriate amounts of the constituents were weighed and then placed in a previously cleaned quartz ampoule. The ampoule was cleaned by etching 30 minutes in a 10% solution of concentrated hydrofluoric (48% HF) acid, rinsing in deionized water about 15 minutes, treating with aqua regia, rinsing in deionized water and then drying. The total weight of each of the samples was between 5 and 15 grams. The constituents were placed in the cleaned tube and evacuated to $10^{-4}$ torr and sealed. The sealed tubes were then placed in a furnace at about 1000° C. for 15 to 36 hours. The furnace was a rocking furnace which may be of any suitable design to provide agitation of the constituents so as to achieve maximum reaction thereof. In some cases the samples were then held in a vertical position for an additional several hours at about 1000° C. and then air quenched.

The sample compositions which failed to form amorphous glass by the air quench-cooling technique are presented in Table I, below, along with the reaction conditions, whereas the compositions which formed amorphous glass are presented in Table II below, with both the reaction conditions and the Soft-Point results achieved for the glass.

TABLE I

| Sample No. | Composition, Atomic Percent | | | Reaction Conditions | |
|---|---|---|---|---|---|
| | Si | As | Te | Temp., °C. | Time, Hours |
| 1 | 30 | 10 | 60 | 500 | 16 |
| | | | | 600 | 24 |
| | | | | 700 | 24 |
| | | | | 800 | 24 |
| | | | | 950 | 2 |
| 2 | 35 | 5 | 60 | (¹) | (¹) |
| 3 | 40 | 10 | 50 | (¹) | (¹) |
| 4 | 50 | 10 | 40 | (¹) | (¹) |
| 5 | 25 | 60 | 15 | 900 | 16 |
| | | | | 950 | 2 |
| 6 | 35 | 45 | 20 | 950 | 16 |
| 7 | 60 | 20 | 20 | 950 | 16 |
| 8 | 45 | 35 | 20 | 950 | 16 |
| 9 | 25 | 55 | 20 | 950 | 16 |
| 10 | 50 | 25 | 25 | 950 | 16 |
| 11 | 35 | 10 | 55 | 950 | 24 |
| 12 | 55 | 15 | 30 | 950 | 24 |
| 13 | 50 | 15 | 35 | 950 | 24 |
| 14 | 35 | 40 | 25 | 950 | 24 |
| 15 | 40 | 15 | 45 | 950 | 24 |
| 16 | 45 | 15 | 40 | 950 | 24 |
| 17 | 45 | 15 | 40 | 950 | 24 |

¹ Same as No. 1.

TABLE II

| Sample No. | Composition, Atomic Percent | | | Reaction Conditions | | Wafer Thickness, 10⁻³ in. | Soft Point [1] Temp., °C. |
| --- | --- | --- | --- | --- | --- | --- | --- |
| | Si | As | Te | Temp., °C. | Time, Hours | | |
| 18 | 20 | 20 | 60 | 400 / 500 | 24 / 24 | 28 | 159 |
| 19 | 45 | 25 | 30 | 900 / 950 | 16 / 2 | 28 | 452 |
| 20 | 37 | 30 | 33 | 950 | 2 | 28 | 504 |
| 21 | 25 | 30 | 45 | 950 | 2 | 30 | 331 |
| 22 | 25 | 45 | 30 | 950 | 2 | 30 | 350 |
| 23 | 20 | 40 | 40 | 950 | 16 | 29 | 317 |
| 24 | 25 | 15 | 60 | 950 | 16 | 30 | 270 |
| 25 | 30 | 20 | 50 | 950 | 16 | 30 | 353 |
| 26 | 40 | 20 | 40 | 950 | 16 | 28 | 466 |
| 27 | 30 | 30 | 40 | 950 | 16 | 29 | 360 |
| 28 | 12.5 | 50 | 37.5 | 950 | 16 | 30 | 255 |
| 29 | 20 | 10 | 70 | 950 | 16 | 28 | 178 |
| 30 | 35 | 15 | 50 | 950 | 24 | 28 | 356 |
| 31 | 30 | 15 | 55 | 950 | 24 | 28 | 317 |
| 32 | 15 | 30 | 55 | 950 | 24 | 28 | 210 |
| 33 | 15 | 20 | 65 | 950 | 24 | 28 | 182 |
| 34 | 10 | 45 | 45 | 950 | 24 | 28 | 189 |
| 35 | 20 | 5 | 75 | 950 | 24 | 28 | 195 |
| 36 | 37 | 30 | 33 | 950 | 24 | 28 | 504 |
| 37 | 5 | 25 | 70 | 950 | 24 | 28 | 120 |
| 38 | 10 | 15 | 75 | 950 | 24 | 28 | 124 |
| 39 | 10 | 35 | 55 | 950 | 24 | 28 | 186 |
| 40 | 35 | 20 | 45 | 950 | 24 | 28 | 388 |
| 41 | 40 | 25 | 35 | 950 | 24 | 28 | 513 |
| 42 | 35 | 25 | 40 | 950 | 24 | 28 | 438 |
| 43 | 25 | 25 | 50 | 950 | 24 | 28 | 295 |
| 44 | 30 | 25 | 45 | 950 | 24 | 28 | 438 |
| 45 | 40 | 30 | 30 | 950 | 24 | 28 | 457 |
| 46 | 30 | 40 | 30 | 950 | 24 | 28 | 402 |
| 47 | Pyrex | | | | | 29 | 705 |
| 48 | Pyrex | | | | | 29 | 700 |
| 49 | Si 30 / As 20 / Te 45 / Sb 5 | | | 950 | 14 | 30 | |

[1] Weight of quartz rod was 6 grams.

In FIGURE 1, the peripheral line A circumscribes generally the amorphous compositions of silicon, arsenic and tellurium of the invention. Certain of the sample compositions listed in Table I are plotted in FIGURE 1 by a solid black dot and identified by sample number. Certain of the sample compositions listed in Table II are also plotted in FIGURE 1 within the area circumscribed by line A and indicated by a circle and identified by sample number.

Figure 2:
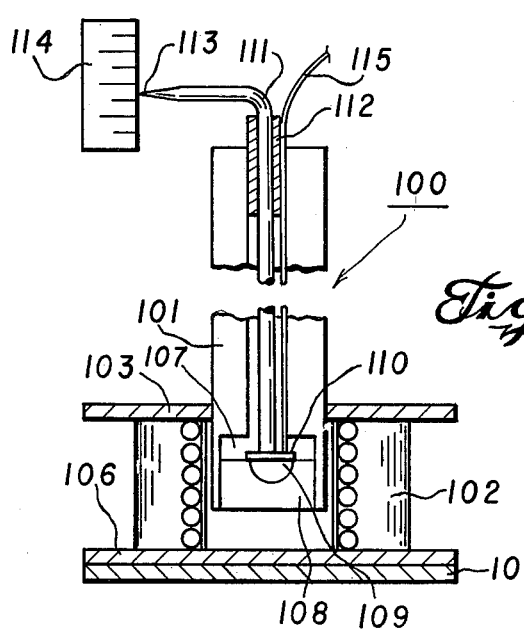
FIGURE 2 illustrates a Soft-Point apparatus utilized in obtaining characteristic properties of the glass.

Referring specifically to FIGURE 2, the apparatus utilized in determining the Soft-Point listed in Table II is depicted therein. The apparatus, generally referred to as 100, consists of a quartz tube 101 supported within a heating mantle 102 by mounting plate 103. The heating mantle 102 has a base plate 104 seated on an asbestos pad 106. The quartz tube 101 has an enlarged bore 107 which retains a boron nitride sample holder 108 having a hollow depression 109 therein. A sample slice 110 to be tested for Soft-Point is placed over the depression 109. A quartz rod 111 is supported within the quartz tube 101, resting against the surface of sample 110. To maintain the quartz rod in vertical alignment with respect to the quartz tube 101, a quartz guide 112 is provided. At the upper end of the quartz rod 111 a right angle bend is provided therein and the end of the quartz rod tapered to form a pointer 113. A scale 114 is provided to show movement of the quartz rod 111. The scale 114 is supported by means not illustrated in fixed relation to the sample slice 110. A thermocouple 115 is provided abutting the sample surface for measuring the temperature of sample 110.

In operation of the Soft-Point test apparatus 100, an amorphous glass sample 110 is placed in its proper position and heat is applied by the heating manifold 102. The temperature of the sample is increased approximately 6° C. per minute until the quartz rod 111, under the influence of its weight, deforms the sample 110, the amount of the deformation being indicated by the pointer 113 moving over the scale 114.

For purposes of comparison, Pyrex glass samples 0.030 of an inch in thickness having a known softening point (according to ASTM standards) of approximately 820° C. were tested in the apparatus 100 and exhibited a Soft-Point of 700° C. and 706° C.

The room temperature transmission of the various samples at various wave lengths of the electromagnetic spectrum are presented in Table III below.

TABLE III

*Percent Transmission at Room Temperature for Samples Listed*

| Sample No. | 19 | 20 | 21 | 23 | 24[1] | 25[2] | 26 | 27 | 28 | 29 | 30 | 31 | 49[3] |
| --- | --- | --- | --- | --- | --- | --- | --- | --- | --- | --- | --- | --- | --- |
| Wave Length, Microns: | | | | | | | | | | | | | |
| 2 | 22 | 20 | 46 | 50 | 47 | 62 | 62 | 61 | 19 | 32 | 49 | 50 | 53 |
| 3 | 27 | 23 | 46 | 53 | 48 | 64 | 65 | 52 | 19 | 37 | 49 | 52 | 57 |
| 4 | 32 | 29 | 47 | 52 | 51 | 63 | 67 | 49 | 19 | 37 | 49 | 53 | 61 |
| 5 | 36 | 32 | 46 | 52 | 51 | 62 | 67 | 53 | 19 | 33 | 48 | 54 | 61 |
| 6 | 38 | 35 | 48 | 56 | 53 | 64 | 68 | 62 | 19 | 40 | 48 | 55 | 61 |
| 7 | 40 | 37 | 48 | 54 | 52 | 64 | 68 | 59 | 19 | 41 | 49 | 55 | 61 |
| 8 | 41 | 39 | 51 | 53 | 53 | 64 | 66 | 59 | 19 | 41 | 48 | 56 | 61 |
| 9 | 42 | 39 | 47 | 52 | 52 | 62 | 64 | 50 | 17 | 40 | 49 | 25 | 56 |
| 10 | 36 | 35 | 42 | 50 | 50 | 54 | 52 | 50 | 18 | 39 | 42 | 48 | 53 |
| 11 | 36 | 36 | 42 | 49 | 51 | 51 | 53 | 53 | 18 | 42 | 48 | 51 | 53 |
| 12 | 37 | 38 | 41 | 51 | 51 | 62 | 64 | 54 | 18 | 42 | 47 | 55 | 53 |
| 13 | 33 | 34 | 35 | 48 | 47 | 53 | 54 | 44 | 16 | 41 | 43 | 59 | 48 |
| 14 | 29 | 32 | 30 | 36 | 35 | 43 | 46 | 37 | 15 | 28 | 37 | 38 | 42 |
| 15 | 33 | 34 | 35 | 43 | 40 | 50 | 54 | 43 | 17 | 31 | 41 | 43 | 45 |
| 16 | 34 | 35 | 39 | 44 | 46 | 54 | 57 | 46 | 17 | 38 | 43 | 47 | 47 |
| 17 | --- | --- | --- | --- | --- | --- | --- | --- | --- | --- | --- | --- | 47 |

[1] Infrared transmission at 300° C. was 81 percent of room temperature transmission for the 8–14 micron region.
[2] Infrared transmission at 500° C. was 60 percent of room temperature transmission for the 8–14 micron region.
[3] Sb containing sample.

In FIGURE 3, the percent transmission of the electromagnetic spectrum in the 1 to 20 micron wave length region is plotted for various of the glass samples contained in Table II.

It should be understood that although most of the samples tested were essentially silicon, arsenic and tellurium, minor percentages of germanium, selenium, sulphur, antimony, phosphorous, bismuth, etc. may be used in the glass of the invention to provide variations in the softening point and transmission of the glass compositions. Sample No. 49 in Table II illustrates a substitution of antimony for a portion of the arsenic in the glass.

Although only the air quench-cooling method has been described for making the amorphous compositions of matter of the invention, other methods could be used. In some instances it would be desirable to slow cool the glass composition so as to achieve uniform properties when making the composition in large batches. Furthermore, the limits of composition for making amorphous material may be extended by more rapid quenching than provided by air quenching. Also, to achieve amorphous composition, the initial temperature for forming the melt may be extended several hundred degrees higher than described herein.

It should be appreciated that many other variations and changes to the invention will immediately suggest themselves to those skilled in the art and such variations and changes are deemed to be within the purview and scope of the invention as defined in the appended claims.

What is claimed is:

1. An amorphous glass composition consisting essentially of 5 to 45 atomic percent silicon, 30 to 70 atomic percent tellurium and 5 to 50 atomic percent arsenic and lying within the boundary circumscribed by line A of FIGURE 1.

2. The composition of claim 1 containing a minor percentage of an element selected from the group consisting of germanium, selenium, sulphur, antimony, phosphorus and bismuth.

3. The composition of claim 2 wherein said minor percentage element is antimony.

4. The composition of claim 2 containing about 5 atomic percent antimony.

5. Amorphous glass compositions as circumscribed by line A in the ternary diagram of FIGURE 1.

6. An amorphous composition of matter consisting essentially of silicon, arsenic and tellurium lying within the boundary of line A of FIGURE 1 and having good transmission at high temperature in the 1 to 20 micron wave length region of the electromagnetic spectrum.

7. The method of forming an amorphous glass composition having a transmission of the electromagnetic spectrum in the 1 to 20 micron region comprising the steps of forming a melt of 5 to 45 atomic percent silicon, 30 to 70 atomic percent tellurium and 5 to 50 atomic percent arsenic having a composition within the boundary circumscribed by line A of FIGURE 1, heating said melt to a temperature and for a period of time sufficient to completely react said silicon, tellurium and arsenic, and quenching said melt in an invert environment maintained at room temperature.

8. The method of making an amorphous glass composition for transmitting the 1 to 20 micron wave length portion of the electromagnetic spectrum comprising the steps of forming a melt of silicon, tellurium and arsenic having a composition within the boundary circumscribed by line A of FIGURE 1, heating said melt to a temperature and for a period of time sufficient to completely react said silicon, tellurium, and arsenic, and quenching said melt in a room temperature inert ambient.

9. The method of making an amorphous glass composition for transmitting the 1 to 20 micron wave length portion of the electromagnetic spectrum comprising the steps of placing silicon, tellurium and arsenic having a composition within the boundary circumscribed by line A of FIGURE 1 into a reaction vessel, evacuating and sealing said vessel, heating said vessel to a temperature and for a period of time sufficient to form a melt of said composition, and to completely react said silicon, tellurium, and arsenic and quench-cooling said melt.

10. The method of claim 9 wherein said temperature is about 1000° C.

11. The method of claim 10 wherein said period of time is 14 to 24 hours.

12. The method of making an amorphous glass composition for transmitting the 1 to 20 micron wave length portion of the electromagnetic spectrum comprising the steps of placing silicon, tellurium and arsenic having a composition within the boundary circumscribed by line A of FIGURE 1 into a reaction vessel, evacuating and sealing said vessel, heating said vessel to a temperature and for a period of time sufficient to form a melt of said composition, and to completely react said silicon, tellurium, and arsenic and quenching said melt.

13. The method of making amorphous glass composition for transmitting the 1 to 20 micron wave length portion of the electromagnetic spectrum, comprising the steps of placing 5 to 45 atomic percent silicon, 30 to 70 atomic percent tellurium and 5 to 50 atomic percent arsenic into a reaction vessel, evacuating and sealing said vessel, heating said silicon, tellurium and arsenic to a temperature and for a time sufficient to form a melt thereof and to completely react said silicon, tellurium, and arsenic, a composition within the boundary circumscribed by line A of FIGURE 1, and quenching said melt in a room temperature ambient.

References Cited in the file of this patent

UNITED STATES PATENTS

| 2,883,292 | Jerger | Apr. 21, 1959 |
| 2,883,293 | Jerger | Apr. 21, 1959 |

FOREIGN PATENTS

| 744,205 | Great Britain | Feb. 1, 1956 |
| 784,869 | Great Britain | Oct. 16, 1957 |

OTHER REFERENCES

Glaze: Transmittance of Infrared Energy by Glasses, Bull. Amer. Cer. Soc., vol. 34, No. 9 (1955) (pages 291–294).